(12) United States Patent
Sasamoto

(10) Patent No.: US 7,312,005 B2
(45) Date of Patent: Dec. 25, 2007

(54) COLOR FILTER MANUFACTURING METHOD

(75) Inventor: Tsuneo Sasamoto, Miyagi (JP)

(73) Assignee: Fujilfilm Corporation, Tokyo (JP)

( * ) Notice: Subject to any disclaimer, the term of this patent is extended or adjusted under 35 U.S.C. 154(b) by 0 days.

(21) Appl. No.: 11/373,283

(22) Filed: Mar. 13, 2006

(65) Prior Publication Data
US 2006/0210892 A1 Sep. 21, 2006

(30) Foreign Application Priority Data
Mar. 15, 2005 (JP) .......................... P.2005-073109

(51) Int. Cl.
G02B 5/20 (2006.01)

(52) U.S. Cl. .......................... 430/7; 430/328; 430/330

(58) Field of Classification Search ..................... None
See application file for complete search history.

(56) References Cited

FOREIGN PATENT DOCUMENTS

JP    11-174221 A    *   7/1999
JP    2000-122306 A       4/2000

* cited by examiner

Primary Examiner—John A. McPherson
(74) Attorney, Agent, or Firm—Birch, Stewart, Kolasch & Birch, LLP

(57) ABSTRACT

A method of manufacturing a color filter comprises: applying a color filter material of a negative type onto a surface; an exposing treatment to the color filter material; a developing treatment for the exposed color filter material; a light irradiating step of irradiating a light on the developed color filter material; and a heating treatment, in this order, so as to form the color filter.

5 Claims, 5 Drawing Sheets

COLOR FILTER MANUFACTURING METHOD

BACKGROUND OF THE INVENTION

1. Field of the Invention

The present invention relates to a color filter manufacturing method of applying a color filter material of a negative type onto a surface and carrying out an exposing treatment, a developing treatment and a heating treatment in this order, thereby forming a color filter.

2. Description of the Related Art

A color filter to be used in a solid-state image pick-up unit has generally been manufactured by a lithographic process (for example, JP-A-2000-122306).

FIGS. 5A to 5C are views for explaining a process for manufacturing a conventional color filter for a solid-state image pick-up unit. As shown in FIG. 5A, a coloring resist of a pigment dispersion type having a photosensitivity (a color filter material of a negative type) is applied onto a flattened film 100 to form a color filter material film and an exposing treatment is carried out by using a mask M having a predetermined pattern. As shown in FIG. 5B, next, a developing treatment for removing a portion other than the exposed portion is carried out. Next, a heating treatment for heating the color filter material film obtained after the developing treatment is executed to form a color filter having a predetermined pattern. By repetition of a serial process having the application of the color filter material film, the exposing treatment, the developing treatment and the heating treatment corresponding to a desirable number of colors in a color filter to be loaded onto a solid-state image pick-up unit, a color filter for a solid-state image pick-up unit having a desirable number of colors is manufactured.

In the exposing treatment, a portion on which a light is irradiated in a color filter material of a negative type causes a crosslinking reaction. In case of the color filter material of a negative type, however, a light transmittance is not very high. In a portion 101a which is close to the flattened film 100, therefore, the exposing treatment is ended without the generation of the crosslinking reaction. For this reason, in the case in which the heating treatment or a solvent treatment is carried out after the exposing and developing treatments, the portion 101a which is close to the flattened film 100 is deformed as shown in Fig. 5C. Therefore, it is hard to obtain a color filter taking a stable shape. When the color filter is deformed, there is a problem in that colors are mixed in the solid-state image pick-up unit, resulting in a deterioration in a performance.

SUMMARY OF THE INVENTION

The invention has been made in consideration of the circumstances and has an object to provide a method of manufacturing a color filter which can form a color filter taking a stable shape.

The invention provides a method of manufacturing a color filter in which a color filter material of a negative type is applied onto a surface, and an exposing treatment, a developing treatment and a heating treatment are carried out in this order to form a color filter, comprising a light irradiating step of irradiating a light on the color filter material subjected to the developing treatment between the developing treatment and the heating treatment.

According to the method, at the light irradiating step, it is possible to eliminate a region in which the crosslinking reaction is not generated in the color filter material subjected to the developing treatment. Therefore, the color filter is deformed with difficulty by the subsequent heating treatment. Consequently, it is possible to form a color filter taking a stable shape.

The invention provides the method of manufacturing a color filter, wherein a light is irradiated obliquely with respect to the color filter material subjected to the developing treatment at the light irradiating step.

According to the method, a light can sufficiently be irradiated on a side wall portion of the color filter material subjected to the developing treatment. Thus, it is possible to form a color filter taking a stabler shape.

The invention provides the method of manufacturing a color filter, wherein the light is irradiated while positions of a light source for the light irradiation and the color filter material subjected to the developing treatment are changing relatively at the light irradiating step.

According to the method, a light can be irradiated evenly over the whole color filter material subjected to the developing treatment. Thus, it is possible to form a color filter taking a stabler shape.

The invention provides the method of manufacturing a color filter, wherein the light is irradiated by using the same light source as a light source to be utilized in the exposing treatment at the light irradiating step.

According to the method, it is not necessary to move the color filter material subjected to the developing treatment from a place in which the exposing and developing treatments are to be carried out. Thus, it is possible to prevent an increase in a manufacturing duration.

The invention provides the method of manufacturing a color filter, wherein the color filter is a primary color type or complementary color type color filter.

The invention provides the method of manufacturing a color filter, wherein the color filter is obtained in a combination of a primary color type or complementary color type color filter and an ND filter.

DETAILED DESCRIPTION OF THE INVENTION

An embodiment of the invention will be described below with reference to the drawings.

Figure 1:
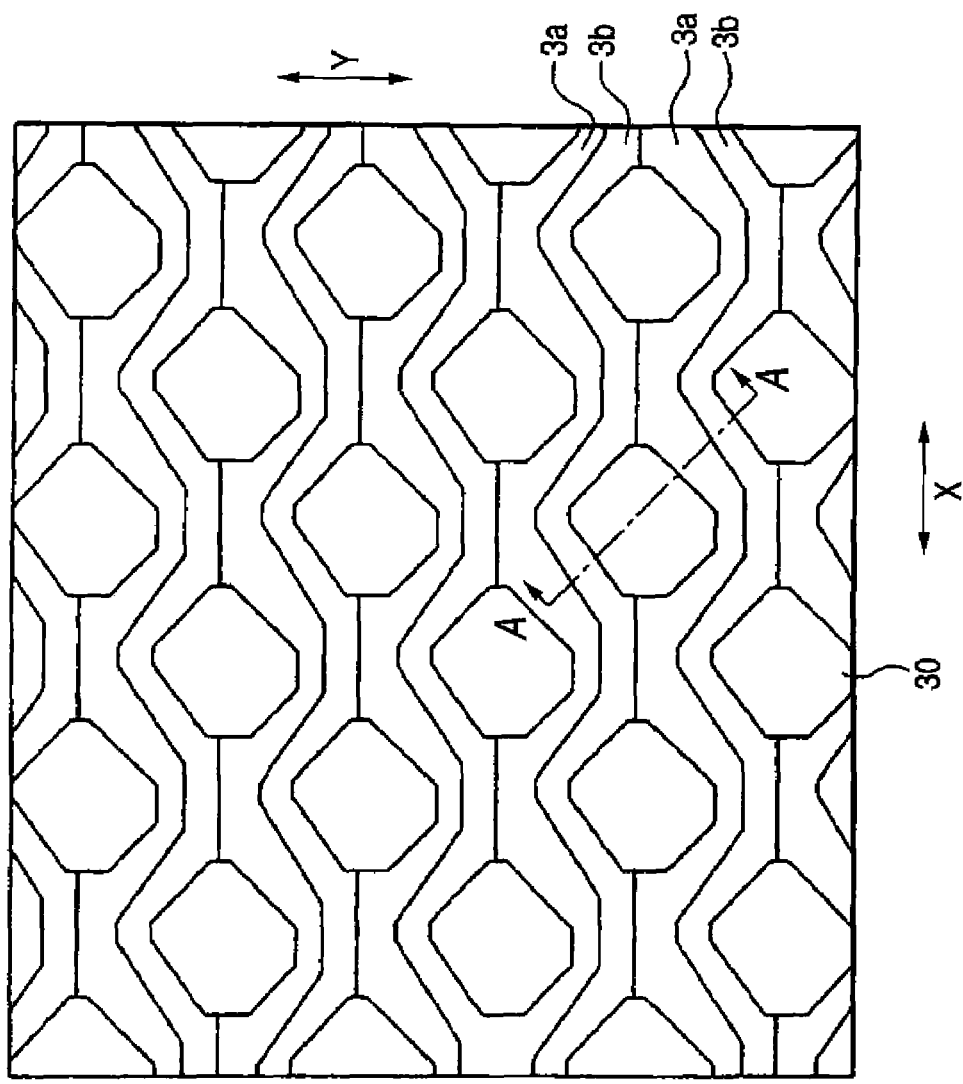
FIG. 1 is a typical plan view showing a solid-state image pick-up unit according to an embodiment of the invention.
Figure 2:
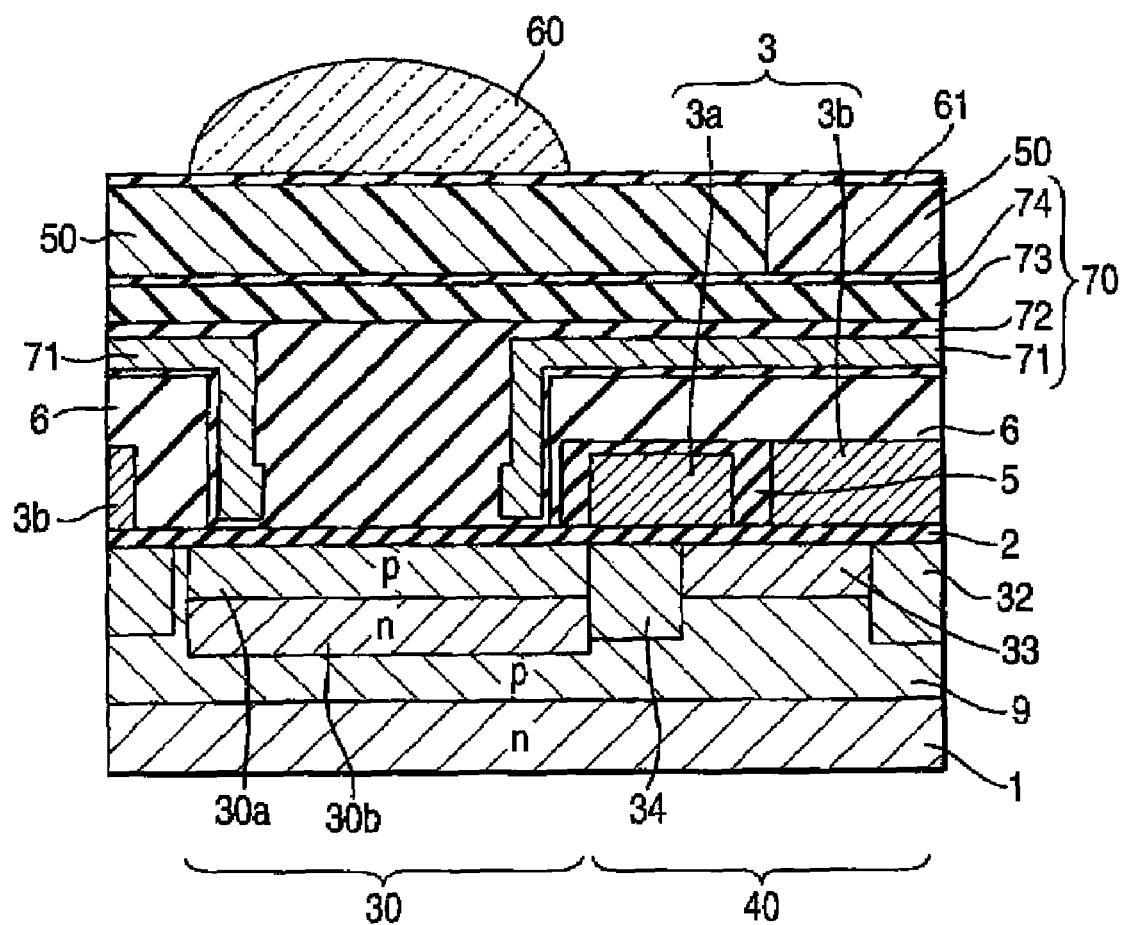
FIG. 2 is a typical sectional view taken along an A-A line in FIG. 1.

FIG. 1 is a typical plan view showing a solid-state image pick-up unit according to an embodiment of the invention. FIG. 2 is a typical sectional view taken along an A-A line in FIG. 1.

In the solid-state image pick-up unit shown in FIGS. 1 and 2, a large number of photodiodes 30 to be photoelectric converting portions are formed in a surface portion of an n-type silicon substrate 1, and an electric charge transfer portion 40 for transferring a signal charge generated in each of the photodiodes 30 in a direction of a column (a Y direction in FIG. 2) meanders between a plurality of photodiode lines formed by the photodiodes 30 which are disposed in the direction of the column.

The electric charge transfer portion 40 includes a plurality of electric charge transfer channels 33 formed in a direction of a column in the surface portion of the silicon substrate 1 corresponding to a plurality of photodiode lines, an electric charge transfer electrode 3 (a first electrode 3a and a second electrode 3b) having a single layer electrode structure which is formed on the electric charge transfer channel 33, and an electric charge reading region 34 for reading an electric charge generated in the photodiode 30 onto the electric charge transfer channel 33. The electric charge transfer electrode 3 takes a meandering shape to be extended in a direction of a row (an X direction in FIG. 2) as a whole between the photodiode lines formed by the photodiodes 30 which are disposed in the direction of the row. The electric charge transfer electrode 3 may have a double-layer electrode structure in which a part of the second electrode 3b is superposed on the first electrode 3a.

As shown in FIG. 2, a p well layer 9 is formed on the surface portion of the silicon substrate 1 and a p region 30a is formed on a surface portion of the p well layer 9, and an n region 30b is formed under the p region 30a and the p region 30a and the n region 30b constitute the photodiode 30. Thus, a signal charge generated in the photodiode 30 is stored in the n region 30b.

The electric charge transfer channel 33 formed by an n region is provided on a right side of the p region 30a slightly apart therefrom. The electric charge reading region 34 is formed on the p well layer 9 between the n region 30b and the electric charge transfer channel 33.

A gate oxide film 2 is formed on the surface of the silicon substrate 1, and the first electrode 3a and the second electrode 3b are formed on the electric charge reading region 34 and the electric charge transfer channel 33 through the gate oxide film 2. The first electrode 3a and the second electrode 3b are insulated from each other through an inter-electrode insulating film 5. A channel stop 32 formed by a p+ region is provided on a right side of the vertical transfer channel 33 to carry out a separation from the adjacent photodiode 30.

A silicon oxide film 6 is formed on the electric charge transfer electrode 3, and furthermore, an intermediate layer 70 is formed thereon. In the intermediate layer 70, 71 denotes a shielding film, 72 denotes an insulating film formed of BPSG (borophospho silicate glass), 73 denotes an insulating film formed of P-SiN (a passivation film), and 74 denotes a flattened layer formed by a transparent resin film. The shielding film 71 is provided in a part excluding the opening portion of the photodiode 30 in such a manner that a light can be prevented from entering a portion other than a part of the photodiode 30 in the silicon substrate 1. A color filter 50 and a microlens 60 are provided on the intermediate layer 70. A flattened layer 61 formed by an insulating transparent resin is filled between the color filter 50 and the microlens 60.

The solid-state image pick-up unit according to the embodiment has such a structure that a signal charge generated in the photodiode 30 is stored in the n region 30b and the signal charge stored therein is transferred in the direction of the column through the electric charge transfer channel 33, and the signal charge thus transferred is transferred in the direction of the row through an electric charge transfer path (HCCD) which is not shown and a color signal corresponding to the signal charge thus transferred is output from an amplifier which is not shown.

Next, a process for manufacturing a color filter in the process for manufacturing a solid-state image pick-up unit will be described with reference to FIGS. 3A to 3D.

FIGS. 3A to 3D are views showing a process for manufacturing a color filter of a solid-state image pick-up unit according to the embodiment of the invention.

Figure 3A:
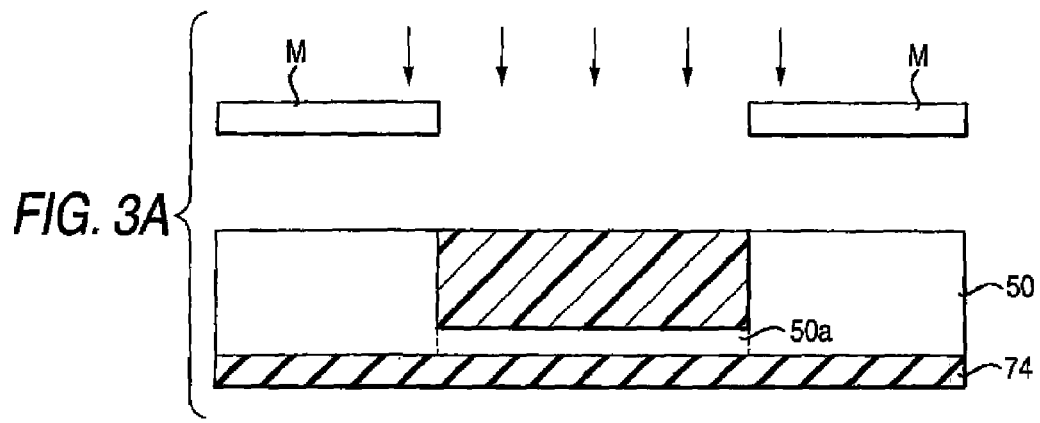
FIGS. 3A to 3D are views showing a process for manufacturing a color filter of a solid-state image pick-up unit according to the embodiment of the invention.

Layers are formed under the flattened layer 74 in the same process as a process for manufacturing a conventional solid-state image pick-up unit and the coloring resist of a pigment dispersion type having a sensitivity (the color filter material of a negative type) 50 is applied onto the flattened layer 74 to carry out an exposing treatment by using a mask M having a predetermined pattern as shown in FIG. 3A. In FIGS. 3A to 3D, hatching is given to only a portion in which a crosslinking reaction is generated in the color filter material 50.

Figure 3B:
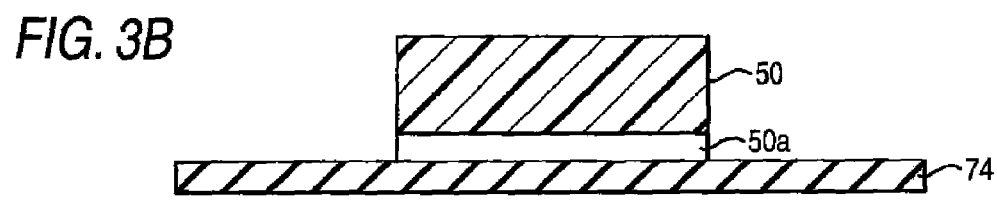
Figure 3C:
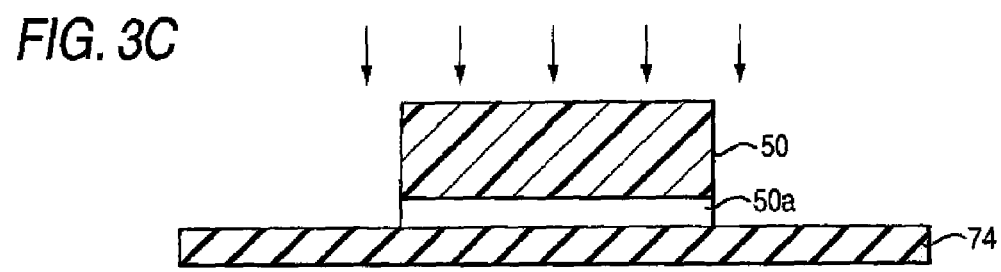

As shown in FIG. 3B, next, a developing treatment for removing portions other than the exposed portion is carried out. At this time, the crosslinking reaction is not generated in a portion 50a of the color filter material 50 subjected to the development which is close to the flattened layer 74 (which will be hereinafter referred to as a noncrosslinked region 50a) as described above. In the embodiment, therefore, a light is irradiated on the color filter material 50 subjected to the development from just above in such a manner that the crosslinking reaction is generated in the noncrosslinked region 50a (FIG. 3C). By the execution of the light irradiation, the crosslinking reaction is generated in the noncrosslinked region 50a to bring a state in which a deformation is not caused by a subsequent heating treatment or solvent treatment.

The light irradiation may be carried out by using a light source of a stepper exposing device utilizing an exposing treatment or by using a light source such as a separate UV curing device from the exposing device. In the case in which the light source of the stepper exposing device is used, it is possible to carry out the light irradiation together in a place in which a photolithographic step is to be carried out. Consequently, it is not necessary to move a silicon substrate to another place in order to carry out the light irradiation. Thus, a time required for manufacturing a color filter can be prevented from being increased.

Figure 3D:
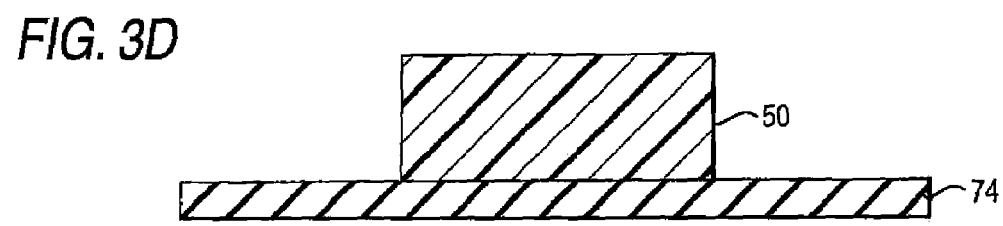

After the light irradiation is carried out, a heating treatment (a baking treatment) for heating the color filter material 50 is executed to form a color filter having a predetermined pattern taking a stable shape (FIG. 3D).

Then, a serial processing in FIGS. 3A to 3D is carried out repetitively corresponding to a desirable number of colors of a color filter to be loaded onto the solid-state image pick-up unit so that the color filter for the solid-state image pick-up unit having a desirable number of colors is manufactured. The color filter to be loaded onto the solid-state image pick-up unit includes a color filter in which color filters for primary colors (red, green and blue) are disposed on the same plane (which is equivalent to a primary color type color filter described in Claims), a color filter in which color filters for complementary colors (cyan, magenta and yellow) are disposed on the same plane (which is equivalent to a complementary color type color filter described in the Claims), and a color filter in which a color filter for a primary color or a complementary color and a color filter for a white color (an ND filter) are disposed on the same plane (which is equivalent to a color filter in which a primary color type or complementary color type color filter and the ND filter are combined as described in the Claims).

As described above, according to the embodiment, a light irradiating treatment for irradiating a light on a color filter material is added between the developing treatment and the heating treatment in the conventional process for manufacturing a color filter. Consequently, it is possible to carry out the heating treatment in a state in which the crosslinking reaction is generated over the whole color filter material. Consequently, the color filter material can be prevented from being deformed due to the heating treatment and the solvent treatment differently from the conventional art. Thus, it is possible to manufacture a color filter taking a stable shape.

Figure 4:
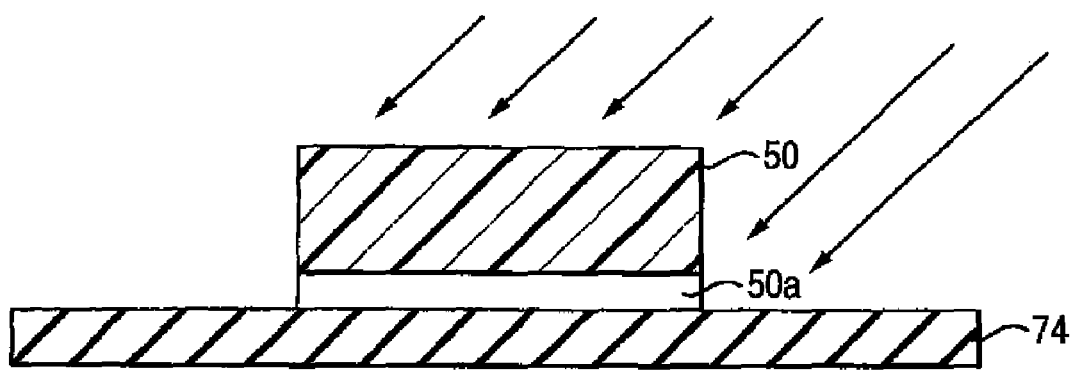
FIG. 4 is a view showing a variant of a method of irradiating a light.
Figure 5A:
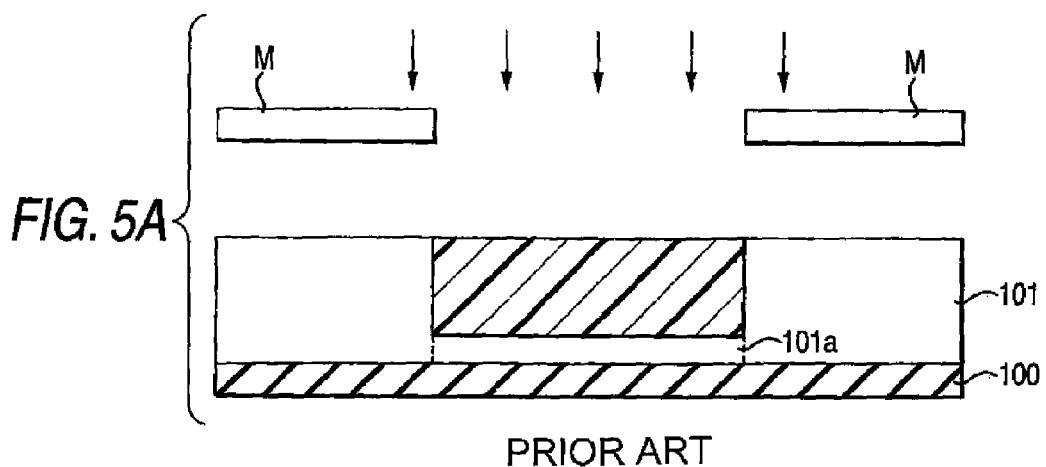
FIGS. 5A to 5C are views for explaining a conventional process for manufacturing a color filter for a solid-state image pick-up unit.
Figure 5B:
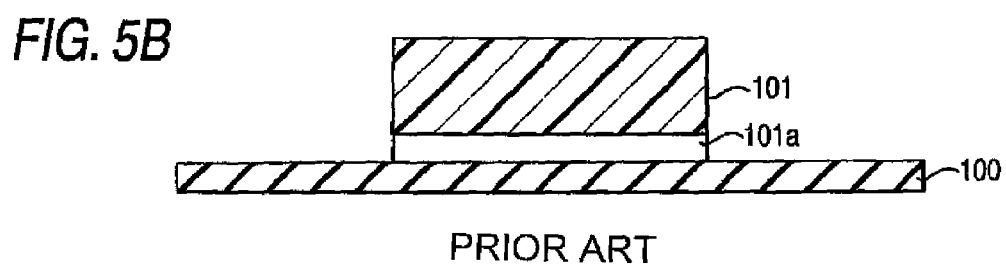
Figure 5C:
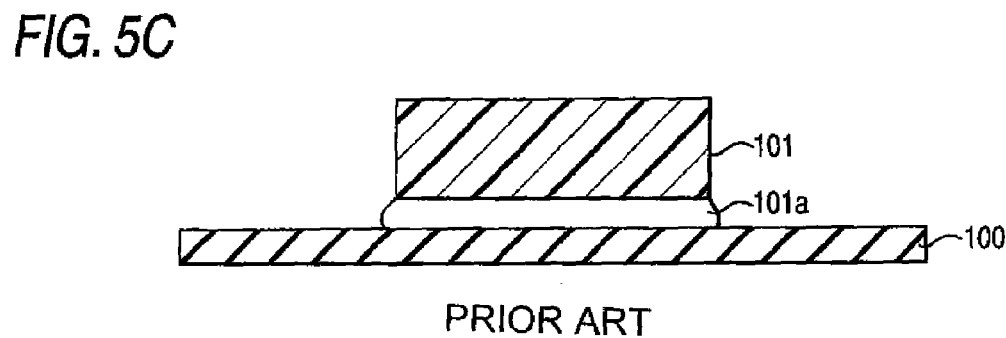

While the light has been irradiated from just above the color filter material 50 subjected to the developing treatment in the above description, the light may be irradiated obliquely with respect to the color filter material 50 subjected to the developing treatment as shown in FIG. 4 or the light may be irradiated from just above and obliquely. By irradiating the light obliquely, it is possible to increase an amount of light irradiation on a side wall of the color filter material 50. Thus, it is possible to increase a speed of a crosslinking reaction in the noncrosslinked region 50a.

In the case in which the light is irradiated obliquely, the silicon substrate is rotated in a state in which the light source is fixed and disposed in a position in which the light is irradiated obliquely with respect to the silicon substrate or the light source is turned around the silicon substrate with the silicon substrate fixed and disposed, or both the silicon substrate and the light source are rotated and turned. Consequently, it is possible to irradiate the light evenly over the whole side wall portion of the color filter material 50. By moving at least one of the light source and the silicon substrate in parallel (for example, moving the light source in parallel during a delivery device processing), alternatively, it is possible to obtain an advantage that the light is irradiated evenly.

While the color filter to be loaded onto the solid-state image pick-up unit has been taken as an example in the embodiment, moreover, the method of manufacturing a color filter according to the invention can also be applied to units other than the solid-state image pick-up unit. In case of the solid-state image pick-up unit, an increase and fineness of a pixel has progressed. For this reason, it is very important to stabilize the shape of the color filter. The invention is particularly effective when it is applied to the solid-state image pick-up unit.

According to the invention, it is possible to provide a method of manufacturing a color filter which can form a color filter taking a stable shape.

The entire disclosure of each and every foreign patent application from which the benefit of foreign priority has been claimed in the present application is incorporated herein by reference, as if fully set forth.

What is claimed is:

1. A method of manufacturing a color filter comprising:
    applying a color filter material of a negative type onto a surface;
    an exposing treatment to the color filter material;
    a developing treatment to the exposed color filter material;
    a light irradiating step of irradiating a light on the developed color filter material, wherein the light is irradiated obliquely with respect to the developed color filter material; and
    a heating treatment,
in this order, so as to form the color filter.

2. The method of manufacturing a color filter according to claim 1,
    wherein the light is irradiated while positions of a light source for light irradiation and the developed color filter material are changing relatively at the light irradiating step.

3. The method of manufacturing a color filter according to claim 1,
    wherein the light is irradiated by using the same light source as a light source to be utilized in the exposing treatment at the light irradiating step.

4. The method of manufacturing a color filter according to claim 1,
    wherein the color filter is a primary color type or complementary color type color filter.

5. The method of manufacturing a color filter according to claim 1,
    wherein the color filter is obtained in a combination of a primary color type or complementary color type color filter and an ND filter.

* * * * *

UNITED STATES PATENT AND TRADEMARK OFFICE
CERTIFICATE OF CORRECTION

PATENT NO. : 7,312,005 B2
APPLICATION NO. : 11/373283
DATED : December 25, 2007
INVENTOR(S) : Tsuneo Sasamoto It is certified that error appears in the above-identified patent and that said Letters Patent is hereby corrected as shown below:

On the Cover Page:

Item (73) Assignee: "Fujifilm Corporation, Tokyo (JP)" should read as

--FUJIFILM Corporation, Tokyo (JP)--

Signed and Sealed this

Nineteenth Day of August, 2008

JON W. DUDAS
*Director of the United States Patent and Trademark Office*